United States Patent [19]

Sacconi et al.

[11] Patent Number: 4,639,506

[45] Date of Patent: Jan. 27, 1987

[54] PROCESS FOR PREPARING POLYPHENYLENETHERS

[75] Inventors: Luigi Sacconi, Florence; Marco Foa'; Elena Bencini, both of Novara; Giampiero Sabarino, Vercelli, all of Italy

[73] Assignee: Montedison S.p.A., Milan, Italy

[21] Appl. No.: 721,541

[22] Filed: Apr. 9, 1985

[30] Foreign Application Priority Data

Apr. 10, 1984 [IT] Italy ................ 20456 A/84

[51] Int. Cl.$^4$ ............................................. C08G 33/00
[52] U.S. Cl. ..................... 528/212; 528/215; 528/216
[58] Field of Search .................... 528/212, 215, 216

[56] References Cited

U.S. PATENT DOCUMENTS

| | | | |
|---|---|---|---|
| 3,219,625 | 11/1965 | Blanchard et al. | 528/216 |
| 3,234,183 | 2/1966 | Hay | 528/216 |
| 3,256,243 | 6/1966 | Blanchard et al. | 528/216 |
| 3,306,875 | 2/1967 | Hay | 528/216 |
| 3,431,238 | 3/1969 | Borman | 528/216 |
| 3,642,699 | 2/1972 | Cooper et al. | 528/216 |
| 4,404,359 | 9/1983 | Naarmann et al. | 528/216 |

FOREIGN PATENT DOCUMENTS 1595609 8/1973 Fed. Rep. of Germany ...... 528/216

Primary Examiner—John Kight
Assistant Examiner—M. L. Moore

[57] ABSTRACT

Polyphenylenethers are prepared by oxidative polymerization of phenols in the presence of oxygen and of organic bases (amines), by using copper-based catalysts having general formula:

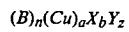

$(B)_n(Cu)_a X_b Y_z$ wherein
B = optionally substituted naphthiridie group,
X = halogen, or nitro group or perchlorate group,
Y = bridge compound between the copper atoms, of the pyrazole or imidazole type,
z = 0 or 1, wherefore: when z = 0,
a and n, either like or unlike each other, are 1 or 2,
b = an integer from 1 to 3, extremes included, while, when z = 1:
n = a = 2
b = 3.

6 Claims, No Drawings

PROCESS FOR PREPARING POLYPHENYLENETHERS

BACKGROUND OF THE INVENTION

The polyphenylenethers and the processes for preparing same are known and described in several patents (for example U.S. Pat. Nos. 3,306,874; 3,306,875; 3,639,656; 3,642,699; 3,661,848; 3,733,299) in which there is described the use, as catalysts, of various copper salts with primary, secondary and tertiary amines, which allow, however, to obtain catalytic values (copper/monomer molar ratio) not exceeding 1:500.

With a view to attaining high catalytic values, a catalytic system was subsequently suggested (U.S. Pat. No. 3,914,266) consisting of cuprous or cupric bromide with N,N'-disubstituted diamines having 2-3 carbon atoms between the two nitrogen atoms, whose two substituents on the nitrogen atoms are isopropyl groups or alkyl groups, where the carbon atom bound to nitrogen is a tertiary atom.

Such catalyst system is used in the presence of great amounts of a bromide ions source, besides in the presence of a tertiary amine and, optionally, also of a secondary aliphatic amine. That is a complex catalytic system which involves, in particular, a wide use of bromide ions sources and of amine mixtures not easily recoverable.

THE PRESENT INVENTION

We have now found that high catalytic values in the oxidative polymerization of phenols are favorably reached by operating in the presence of oxygen, or of an inert oxygen-containing gas, and in a dissolving medium consisting of a preferably aromatic hydrocarbon, by using new copper catalysts having general formula (I):

$$(B)_n(Cu)_a X_b Y_z \quad (I)$$

where: B is a naphthiridine group, with the two nitrogen atoms placed one in respect of the other in any possible relative positions, also substituted by one or more groups such as, e.g., alkyl, cycloalkyl, arylalkyl, aromatic groups, including substituted aromatic groups, containing from 1 to 10 carbon atoms, alkoxy, phenoxy, haloid, dialkylaminic, carboxyl, ketonic, alkoxycarbonyl groups, nitro-groups, amidic groups, etc.;

X is a halogen atom, preferably chlorine or bromine, or a nitro-group or perchlorate group;

Y is an anionic compound which bridges two copper atoms, deriving from a heteroaromatic structure of the pyrazole or imidazole type, of formula:

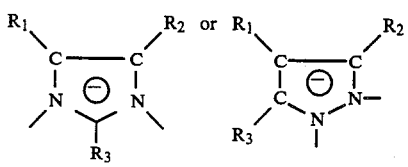

in which:

$R_1$, $R_2$, $R_3$ may be hydrogen, alkyl groups containing from 1 to 5 carbon atoms, cycloalkyl, arylalkyl, aryl or heterocyclic groups, or $R_1$ and $R_2$, together, may form an aromatic ring containing from 6 to 10 carbon atoms or a heteroaromatic ring containing 5 or 6 terms, condensed with the pyrazole or imidazole structure;

z=0, or 1, wherefore: when z=0, a and n, like or unlike each other, are alternatively 1 or 2;

b is an integer ranging from 1 to 3, while: when z=1, n=a=2 b=3.

This general formula includes complexes of cuprous copper, of cupric copper and of mixed valence copper.

Examples of preferred naphthiridine groups are: 1,8-naphthiridine, 4-methyl-1,8-naphthiridine, 1,5-naphthiridine, 2,5-dimethyl-1,8-naphthiridine, 2,7-dimethyl-1,8-naphthiridine, 4-methyl-2-methoxy-1,8-naphthiridine, 4-methyl-2,7-diemthoxy-1,8-, 4-methyl-2,7-dichloro-1,8-naphthiridine.

Examples of radical Y are given by the radicals of imidazole, benzimidazole, 2,2'-diimidazole, 2,2'-dibenzimidazole, 2-methylimidazole, pyrazole, benzopyrazole.

Phenolic monomers utilizable for the polymerization are the ones having general formula (II):

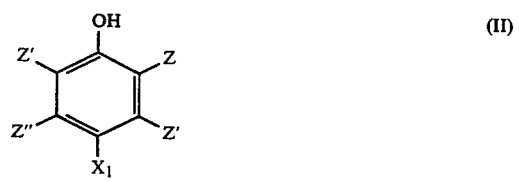

wherein $X_1$ is an atom of hydrogen, chlorine, bromine or iodine; Z is a hydrocarbyl radical or a halohydrocarbyl radical having at least two carbon atoms between the halogen atom and the aromatic nucleus, or it is a hydroxyalkyl radical or a halohydroxyalkyl radical having at least two carbon atoms between the halogen atom and the aromatic ring; Z' and Z'' have the same value as Z, or they may be halogen atoms, provided Z, Z' and Z'' do not have a tertiary carbon atom in alpha position with respect to the aromatic nucleus.

Preferred phenolic monomers are 2,6-dimethylphenol, 2,3,6-trimethylphenol and 2,3,5,6-tetramethylphenol.

The polymerization process is conducted in the presence of an aliphatic organic base, which is preferably represented by a diamine of formula (III):

where A is an alkylene group with a chain of two or three carbon atoms, including alkylene groups substituted by alkyl, cycloalkyl, arylalkyl, aromatic radicals containing from 1 to 10 carbon atoms, or A is a cycloparaffinic radical containing 5 or 6 carbon atoms, including cycloparaffinic radicals substituted by alkyl, cycloalkyl, arylalkyl, aromatic radicals having from 1 to 10 carbon atoms; R', R'', R''', like or unlike one another, are alkyl groups containing 1 to 6 carbon atoms.

Examples of preferred diamines are N,N'-di-tert.butylethylenediamine (t.DBED, N,N'-di-tert.amylethylenediamine (t.DAED) and N,N'-di-tert.octylethylenediamine (t.DOED).

As hydrocarbon solvents there are preferably used aromatic hydrocarbons, such as benzene, toluene, xylenes and the like. Small amounts of solvents other than the hydrocarbon solvents may however be present in admixture with the latter.

Thus, the object of the present invention resides in providing a process for preparing polyphenylenethers by oxidative polymerization of the phenols comprised in general formula (II), as defined hereinbefore, carried out in the presence of oxygen or of an oxygen-containing gas, in a hydrocarbon solvent, or in a prevailingly hydrocarbon solvent, and in the presence of an organic base of formula (III), characterized in that it is operated in the presence of copper catalysts comprised in general formula (I) as defined hereinabove.

The copper complexes, utilized as catalysts in the polymerization process forming the object of the present invention, can be prepared, when in formula (I) $z=0$, according to methods described in literature, for example in Inorg. Chem. 11, 2288 (1972), Inorg. Chem. 15, 2775 (1976), Inorg. Chem. 12, 978 (1973), Acta Cryst. B 33, 710 (1977).

Conversely, when $z=1$, the relevant dimeric bridge complexes are preparable starting from an alcohol solution (for example in methanol or in another aliphatic alcohol) or a divalent copper salt, selected from bromide, chloride, iodide or nitrate, to which the desired naphthiridine, preferably 1,8-, 1,5-, 1,6- or 2,7-naphthiridine, and the sodium salt of the above-defined heteroaromatic compound, in preferred molar ratios of copper/naphthiridine/heteroaromatic compound = 1/1/0.5, are added.

Reaction generally occurs at room temperature and is practically immediate, with precipitation of the product to be obtained, which is filtered, repeatedly washed with alcohol or with ethyl ether, and dried.

The copper catalytic complex can be used in the preformed state, obtained as described hereinabove, or it can be prepared in situ.

In such case it is operated by adding the copper salt (either cuprous or cupric), in a proper stoichiometric ratio, to the solution of naphthiridine in the polymerization hydrocarbon solvent. At the end of the time required to form the complex, polymerization is carried out according to the modalities described hereinafter.

Finally, the catalysts according to the invention can be used in a carried form, utilizing, as carriers, synthetic polymers, such as e.g. chloromethylated styrene/divinylbenzene copolymers, such as the ones commercially available under the trade name "Merrifield", or polymethylacrylates, according to the technique described by Arranz, F., in Rev. Plast. Mod. 1977, 33 (248), 205–12. Generally, it is operated by preparing a lithium-methylnaphthiridine by reaction of methylnaphthiridine with n.butyl-lithium in tetrahydrofuran, then by reacting it with the resins. Subsequently, the cupric complex of the carried naphthiridine is prepared, employing the same preparation conditions as for the non-carried complexes.

Polymerization is accomplished, according to a practical way of operating, by adding the phenolic monomer, preferably by dropping a solution thereof into the polymerization solvent, to the solution containing the free amine and the copper complex, maintained under stirring at a temperature generally higher than 0° C., and preferably ranging from 0° C. to 50° C., while an oxygen-containing gas flow is introduced into the reaction mixture.

On conclusion of the reaction, the polymer is separated by precipitation through addition of methanol.

Generally the polymerization reaction is conducted using monomer/copper molar ratios ranging from 300 to 3000, preferably from 500 to 2000, and using monomer/free amine molar ratios ranging from 10 to 50, preferably from 20 to 30.

The following examples are directed to illustrate the present invention, without being however a limitation thereof.

The examples from 1 to 13 summarized in Table I concern the preparation of the copper complexes as catalysts according to the invention. The examples from 14 to 36, summarized in Table II, concern the use of such preformed complexes as polymerization catalysts of phenols. Example 37 relates to the use of one of such complexes as a catalyst formed in situ. Example 38 relates to the use of a catalyst in the carried form.

EXAMPLE 1

This example relates to the preparation of a complex, containing the heteroaromatic structure bridging two copper atoms, comprised in general formula (I).

In a 50 cc flask, under magnetic stirring and in an inert atmosphere, 2.15 m.moles of cupric salt were dissolved in 100 cc of methanol, whereafter a solution of the sodic salt of imidazole, practically consisting of 1,075 m.moles of such compound and of 1,075 m.moles of NaOH in 10 cc of methyl alcohol, was added thereto.

After a few minutes, 2.15 m.moles of 1,8-naphthiridine dissolved in 10 cc of methanol were added dropwise, and the whole was left under stirring during 15 minutes.

It was filtered, and the precipitate was repeatedly washed with methanol and with ether, and it was dried under vacuum.

The formula and the data relevant to the elemental analysis of the product obtained are indicated in Table I.

EXAMPLES 2–13

By operating according to the methods described in the above-cited literature, the complexes indicated in Table I with the numerals 2 through 13 were prepared. Also the data relating to the elemental analysis, compared with the theoretical ones (in brackets) are recorded on Table I.

EXAMPLE 14

Into a 200 cc reactor equipped with a mechanical stirrer, there were charged, under a nitrogen flow (20–30 liters/hour), 60 cc of toluene, 0.675 g (3.92 m.moles) of N,N'-di-tert.butylethylenediamine and successively 48 mg (0.0993 m.moles) of complex No. 2.

The reactor was brought to a temperature of 30°–35° C. and a solution of 12 g of 2,6-dimethylphenol (98.36 m.moles) in 20 cc of toluene was added dropwise.

The whole was maintained at 30°–35° C. during 2 hours while causing an oxygen flow to pass through the mixture. Then, by precipitation with methanol, 11.2 g (yield=93%) of polyphenylene oxide having an inherent viscosity=0.81 (in $CHCl_3$ at 30° C.) were obtained.

EXAMPLES 15–36

In these examples, 2,6-dimethylphenol was polymerized (with the exception of example 36, in which a mixture of 2,6-dimethylphenol with 2,3,6-trimethylphenol in a 90/10 weight ratio was polymerized) by operating according to modalities similar to the ones described in example 14, but using different complexes of copper and/or amines as components of the catalytic system. In all cases, toluene was used as a solvent, with exception of example 35, where a toluene/methanol mixture 90/10 by volume was utilized.

The type and the amounts of complex of copper and of amine used in examples 14 through 36, the main characteristics of the reaction and the inherent viscosity of the polymer so obtained are indicated in Table II.

EXAMPLE 37

25 cc of toluene, 22.4 g (0.1 m.moles) of $CuBr_2$ and 26 mg (0.2 m.moles) of 1,8-naphthiridine were charged into the same reactor of example 14, under an oxygen flow.

The reactor was brought to a temperature of 30°-35° C. and the whole was stirred, under an oxygen flow, for about 30 minutes, whereupon further 35 cc of toluene and 0.675 g (3.92 m.moles) of N,N'-di-tert.butyl-ethylenediamine were added.

After a few minutes, a solution of 12 g (93.36 m.moles) of 2,6-dimethylphenol in 20 cc of toluene was introduced dropwise, in 10 minutes, into the reactor. The whole was maintained at 30°-35° C. during 3.5 hours, always under an oxygen flow, then, by precipitation with methanol, 10.6 g of polyphenylene oxide (yield=88%) havin an inherent viscosity=0.73 (in $CHCl_3$ at 30° C.) were obtained.

EXAMPLE 38

Into the same reactor of example 14, under an oxygen flow, 45 cc of toluene and 0.4866 g (2.83 m.moles) of N,N'-di-tert.butyl-ethylenediamine were charged; successively there were added 3.1 g of resin (chloromethylated copolymer of styrene/divinylbenzene) containing 0.14 m.moles of copper in the form of a complex with 4-methyl-1.8-naphthiridine, which had been carried on the resin as previously described. The reactor was brought to a temperature of 30°-35° C. and a solution of 8.65 g (70.9 m.moles) of 2,6-dimethylphenol in 15 cc of toluene was added dropwise in 10 minutes. The whole was kept at 30°-35° C. during 4 hours, always under an oxygen flow, then, by precipitation with methanol, 7.8 g (yield=90%) of polyphenyleneoxide having $[\eta]=0.56$ (measured in $CHCl_3$ at 30° C.) were obtained.

TABLE I

| Complex relating to the Examples | Structure | Elemental analysis (% by weight) | | | | |
|---|---|---|---|---|---|---|
| | | Cu | Halogen | C | H | N |
| 1 | [(naphthyridine)Cu]ImBr₃]₂ (Im = imidazolate) | 17.56 (18.2) | 33.77 (34.6) | 32.3 (32.9) | 2.26 (2.16) | 11.95 (12.12) |
| 2 | (naphthyridine)₂CuBr₂ | 13.09 (13.04) | 32.78 (33.12) | 40.00 (39.75) | 2.76 (2.5) | 11.25 (11.6) |
| 3 | (naphthyridine)CuBr₂ | 18.20 (17.85) | 45.2 (45.3) | 27.6 (27.2) | 1.9 (1.7) | 7.85 (7.9) |
| 4 | (naphthyridine)CuCl₂ | 23.36 (23.86) | 26.3 (26.9) | 35.67 (36.36) | 2.27 (2.38) | 10.35 (10.15) |
| 5 | (naphthyridine)₂CuCl₂ | 16.04 (16.0) | 17.5 (18.0) | 48.65 (48.73) | 2.8 (3.05) | 13.9 (14.2) |
| 6 | (4-methyl-2-methoxy-naphthyridine)₂CuBr₂ | 11.55 (11.03) | 27.9 (28.02) | 40.9 (42.0) | 3.5 (3.5) | 9.4 (9.8) |

TABLE I-continued

| Complex relating to the Examples | Structure | Elemental analysis (% by weight) | | | | |
|---|---|---|---|---|---|---|
| | | Cu | Halogen | C | H | N |
| 7 | (1,8-naphthyridine)·Cu$_2$Cl$_2$ | 37.84 (38.5) | 21.02 (21.7) | 29.65 (29.36) | 2.015 (1.84) | 8.64 (8.56) |
| 8 | (4-CH$_3$-1,8-naphthyridine)$_2$·Cu$_2$Cl$_3$ | 24.06 (24.36) | 20.85 (20.38) | 41.63 (41.43) | 3.24 (3.08) | 10.76 (10.73) |
| 9 | (2,7-di-CH$_3$-1,8-naphthyridine)$_2$·CuBr$_2$ | 11.47 (11.69) | 29.4 (29.68) | 44.81 (44.52) | 3.8 (3.71) | 10.15 (10.4) |
| 10 | (4,7-di-CH$_3$-1,8-naphthyridine)$_2$·CuCl$_2$ | 14.83 (14.0) | 15.43 (15.77) | 52.8 (53.3) | 4.38 (4.44) | 12.3 (12.44) |
| 11 | (4-CH$_3$-2,7-di-OCH$_3$-1,8-naphthyridine)$_2$·CuBr$_2$ | 10.58 (9.98) | 25.15 (25.36) | 40.8 (41.8) | 3.7 (3.8) | 8.54 (8.87) |
| 12 | (4-CH$_3$-2,7-di-Cl-1,8-naphthyridine)$_2$·CuCl$_2$ | 11.29 (11.25) | 37.5 (38.03) | 38.48 (38.57) | 2.48 (2.14) | 9.8 (10.0) |
| 13 | (1,5-naphthyridine)·CuBr$_2$ | 17.63 (17.85) | 45.22 (45.3) | 27.82 (27.2) | 2.04 (1.7) | 7.83 (7.93) |

TABLE II

| Examples | 14 | 15 | 16 | 17 | 18 | 19 | 20 | 21 |
|---|---|---|---|---|---|---|---|---|
| Cu complex relating to Examples No. | 2 | 2 | 2 | 3 | 3 | 4 | 5 | 2 |
| Amine | t. DBED | t. DBED | t. DBED | t. DBED | t. DBED | t. DBED | t. DBED | t. DAED |
| Moles of monomer/ g. atoms of Cu | 1000 | 1500 | 2000 | 1000 | 1000 | 1000 | 1500 | 500 |
| Moles of monomer/ moles of amine | 25 | 25 | 25 | 25 | 36 | 25 | 25 | 12,5 |
| Moles of amine/ g. atoms of Cu | 40 | 60 | 80 | 40 | 28 | 40 | 60 | 40 |
| Reaction time (h) | 2 | 3.5 | 5 | 1 | 3.5 | 3.5 | 5 | 7 |
| [η] 30° C. CHCl$_3$ | 0.81 | 0.48 | 0.36 | 0.66 | 0.44 | 0.69 | 0.51 | 0,22 |

| Examples | 22 | 23 | 24 | 25 | 26 | 27 | 28 | 29 |
|---|---|---|---|---|---|---|---|---|
| Cu complex relating to Examples No. | 2 | 7 | 8 | 8 | 9 | 10 | 10 | 6 |
| Amine | t. DOED | t. DBED | t. DBED | t. DBED | t. DBED | t. DBED | t. DBED | t. DBED |
| Moles of monomer/ g. atoms of Cu | 500 | 1000 | 1500 | 900 | 1500 | 1500 | 2000 | 1500 |
| Moles of monomer/ | 12,5 | 25 | 25 | 25 | 25 | 25 | 25 | 25 |

TABLE II-continued

| | | | | | | | | |
|---|---|---|---|---|---|---|---|---|
| moles of amine Moles of amine/ g. atoms of Cu | 40 | 40 | 60 | 36 | 60 | 60 | 80 | 60 |
| Reaction time (h) | 8 | 5 | 5 | 2 | 5 | 3.5 | 7 | 5 |
| [η] 30° C. CHCl₃ | 0,26 | 0,60 | 0,46 | 0,82 | 0,71 | 0,60 | 0,39 | 0,46 |
| Examples | 30 | 31 | 32 | 33 | 34 | 35 | 36 | |
| Cu complex relating to Examples No. | 11 | 12 | 13 | 1 | 10 | 3 | 2 | |
| Amine | t. DBED | t. DBED | t. DBED | t. DBED | t. DBED | t. DBED | t. DBED | |
| Moles of monomer/ g. atoms of Cu | 1000 | 1000 | 1000 | 1500 | 1800 | 1000 | 1000 | |
| Moles of monomer/ moles of amine | 25 | 25 | 25 | 25 | 25 | 25 | 25 | |
| Moles of amine/ g. atoms of Cu | 40 | 40 | 40 | 60 | 72 | 40 | 40 | |
| Reaction time (h) | 3,5 | 3,5 | 4 | 5 | 7 | 5 | 5 | |
| [η] 30° C. CHCl₃ | 0,92 | 0,90 | 0,51 | 0,29 | 0,49 | 0,38 | 0,60 | |

What we claim is:

1. A process for preparing polyphenylenethers by oxidative polymerization of phenols having the formula:

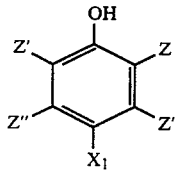

(II)

in which $X_1$ is an atom selected from the group consisting of hydrogen, chlorine, bromine and iodine; Z is a radical selected from the group consisting of hydrocarbyl and halohydrocarbyl radicals having at least two carbon atoms between the halogen atom and the aromatic nucleus, or Z is a radical selected from the group consisting of hydroxyalkyl and halohydroxyalkyl radicals having at least two carbon atoms between the halogen atom and the aromatic ring;

Z' and Z" are the same as Z, or are halogen atoms, provided Z, Z' and Z" do not have a tertiary carbon atom in position alpha with respect to the aromatic nucleus, which process is carried out with oxygen, in the presence of an aliphatic organic base, in at least prevailingly hydrocarbon medium, and of a catalyst consisting of a copper compound having the formula:

$(B)_n(Cu)_aX_bY_z$ (I)

in which B is a naphthiridine group, with the two nitrogen atoms placed one in respect to the other in any possible relationship, or B is a naphthiridine group substituted by at least one substituent selected from the group consisting of alkyl, cycloalkyl, arylalkyl, aromatic groups, said substituents which are further substituted and contain from 1 to 10 carbon atoms, of alkoxy, phenoxy, haloid, dialkylaminic, carboxyl, ketonic, alkoxycarbonyl groups, nitro-groups, and amidic groups;

X is selected from the group consisting of chlorine or bromine, a nitro-group and a perchlorate group;

Y is an anionic compound bridging two copper atoms, having a heteroaromatic structure selected from pyrazole groups having the formula:

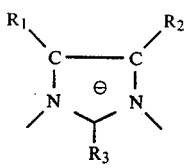

or imidazole groups having the formula

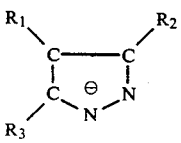

in which formulae: $R_1$, $R_2$, $R_3$ are selected from the group consisting of hydrogen, $C_1$–$C_5$ alkyl, cycloalkyl, arylalkyl, aryl and heterocyclic groups, or $R_1$ and $R_2$ together form an aromatic ring containing from 6 to 10 carbon atoms or a heteroaromatic ring containing 5 or 6 terms, condensed with the pyrazole or imidazole structure;

z is zero or 1, wherefore: when z is zero, a and n, like or unlike each other, are alternatively 1 or 2;

b is an integer from 1 to 3, while: when z is 1, n=a=2, and b=3.

2. The process according to claim 1, in which the aliphatic organic base consists of an amine having the formula:

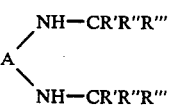

(III)

in which A is an alkylene group with a chain of two or three carbon atoms, such alkylene group substituted by radicals selected from the group consisting of alkyl, cycloalkyl, arylalkyl, and aromatic radicals containing from 1 to 10 carbon atoms, or A is a cycloparaffinic radical containing 5 or 6 carbon atoms or such cycloparaffinic radical substituted by radicals selected from the group consisting of alkyl, cycloalkyl, arylalkyl, and aromatic radicals containing from 1 to 10 carbon atoms; R', R", R'", like or unlike one another, are alkyl groups containing from 1 to 6 carbon atoms.

3. The process according to claim 1, in which the aliphatic organic base is selected from the group consisting of N,N'-di-tert.butyl-ethylenediamine, N,N'-di-tert.amyl-ethylenediamine and N,N'-di-tert.octyle-thylenediamine.

4. The process according to claim 1, in which a copper compound of formula (I) is used in a carried form, the carrier being obtained by reaction of lithium-methylnaphthiridine with a synthetic polymer.

5. The process of claim 4, in which the synthetic polymer is a chloromethylated styrene/divinyl benzene copolymer.

6. The process of claim 4, in which the synthetic polymer is a polymethylacrylate.

* * * * *